(12) United States Patent
Wirz et al.

(10) Patent No.: US 9,228,564 B2
(45) Date of Patent: Jan. 5, 2016

(54) INTEGRATED WIND TURBINE

(75) Inventors: Richard E. Wirz, Altadena, CA (US); Sebastian Aspe, Sacramento, CA (US)

(73) Assignee: The Regents of the University of California, Oakland, CA (US)

( * ) Notice: Subject to any disclaimer, the term of this patent is extended or adjusted under 35 U.S.C. 154(b) by 804 days.

(21) Appl. No.: 13/581,286

(22) PCT Filed: Feb. 25, 2011

(86) PCT No.: PCT/US2011/026372
§ 371 (c)(1),
(2), (4) Date: Aug. 24, 2012

(87) PCT Pub. No.: WO2011/106737
PCT Pub. Date: Sep. 1, 2011

(65) Prior Publication Data
US 2012/0328434 A1 Dec. 27, 2012

Related U.S. Application Data

(60) Provisional application No. 61/308,219, filed on Feb. 25, 2010.

(51) Int. Cl.
*F03D 1/06* (2006.01)
*F03D 3/06* (2006.01)
*F03D 3/00* (2006.01)

(52) U.S. Cl.
CPC .............. *F03D 1/0675* (2013.01); *F03D 3/005* (2013.01); *F03D 3/062* (2013.01); *F05B 2240/311* (2013.01); *F05B 2250/25* (2013.01); *Y02E 10/721* (2013.01); *Y02E 10/74* (2013.01)

(58) Field of Classification Search
CPC ....... F03D 1/0675; F03D 3/062; F03D 3/065; F03D 3/067; F05B 2250/25; F05B 2240/31

USPC .......... 416/90 R, 84, 142, 231 R, 231 B, 232, 416/233, 235, 236 R, 236 A
See application file for complete search history.

(56) References Cited

U.S. PATENT DOCUMENTS 1,820,529 A * 8/1931 Darrieus ............... F03D 1/0608
416/11
3,957,232 A * 5/1976 Sebrell ...................... B34C 3/30
244/123.11

(Continued)

FOREIGN PATENT DOCUMENTS

WO 200505007 A1 6/2005
WO 2006039953 A1 4/2006

(Continued)

OTHER PUBLICATIONS

International Search Report and Written Opinion mailed Oct. 28, 2011, issued in corresponding International Application No. PCT/US2011/026372, filed Feb. 25, 2011, 7 pages.

*Primary Examiner* — Igor Kershteyn
*Assistant Examiner* — Jesse Prager
(74) *Attorney, Agent, or Firm* — Christensen O'Connor Johnson Kindness PLLC (57) ABSTRACT

An integrated wind turbine. Each turbine blade has a flexible skin. Openings in the leading edge lead to one or more inflation chambers for ram air inflation during operation. A pivotal connection with the support post allows the plurality of turbine blades to yaw such that the rotor plane remains substantially perpendicular to the wind direction. The wind turbine may also include self-deploying drag vanes that extend away from the flexible skin when the wind speed is greater than the speed of the airfoil.

13 Claims, 5 Drawing Sheets

(56) References Cited

U.S. PATENT DOCUMENTS

| | | | | |
|---|---|---|---|---|
| 7,435,057 B2 * | 10/2008 | Parera | ............... | F03D 1/0633 415/81 |
| 7,648,339 B1 * | 1/2010 | Ediger et al. | ......... | F04D 29/023 416/142 |
| 7,938,623 B2 * | 5/2011 | Cairo | ................... | F03D 1/065 416/226 |

FOREIGN PATENT DOCUMENTS

| WO | 2008115265 A1 | 9/2008 |
|---|---|---|
| WO | 2009093922 A1 | 7/2009 |

\* cited by examiner

INTEGRATED WIND TURBINE

CROSS-REFERENCES TO RELATED APPLICATIONS

This patent application claims the benefit of U.S. Provisional Patent Application Ser. No. 61/308,219 filed Feb. 25, 2010 for Integrated Wind Turbine. That application is incorporated here by this reference.

TECHNICAL FIELD

This invention relates to designs for wind turbines.

BACKGROUND ART

Currently, the integration of wind turbines into urban and suburban environments (non-traditional placement near or on buildings) is hindered by noise, structural vibrations, installation costs, low-quality (weak and variable) winds, safety, and low performance.

Most modern wind turbines seek an increased power production by means of larger rotor sizes. This resulted in the need for dedicated wind farms for large wind turbines. Hence, the current approach to increasing power production by making larger rotors does not satisfy the needs of building-integrated wind turbines. The weight of the blades directly affects the inertia of the rotor and the loads at the shaft. Therefore, most of the challenges faced by building-integrated wind turbines are due to the turbine weight and size.

Another challenge in current wind turbine design is the "starting" problem. Large turbines require energy expenditure to begin rotating in light and moderate winds, as well as yaw control in the case of Horizontal Axis Wind Turbines (HAWTs). Vertical Axis Wind Turbines (VAWTs) can make use of winds from all directions and are structurally less demanding than HAWTs. But VAWTs that are lift-driven are not self-starting even in strong winds, and must first be sped up to a certain angular velocity before the aerodynamic forces can drive the shaft's rotation. Drag-driven VAWTs are self-starting, but their efficiency is inferior to the lift-driven turbines.

In addition, the elevated costs of currently available micro-wind turbines and their installation outweigh the benefits until the investment is amortized years later.

Accordingly, making use of wind in areas not specifically dedicated to wind energy and empowering lift-driven devices to self-start will benefit wind turbine performance by targeting key aspects that determine their efficiency.

DISCLOSURE OF INVENTION

The present invention is directed to an integrated wind turbine. One aspect of the invention can be described as a horizontal axis wind turbine in relation to a wind direction. The wind turbine includes a support post, a shaft, and a plurality of turbine blades.

The shaft is pivotally connected to the support post at the upwind portion of the shaft. The shaft also defines an axis of rotation. The plurality of turbine blades extends radially from the downwind portion of the shaft, and the turbine blades are equally spaced radially about the shaft.

Each turbine blade has a flexible skin and an internal skeleton within the flexible skin. The flexible skin includes a leading edge, an upper surface, and a lower surface. The leading edge has one or more openings. The upper surface, the lower surface, and the internal skeleton form a plurality of inflation chambers. Each opening in the leading edge leads to one or more of the inflation chambers for ram air inflation during operation. In the inflated condition, the plurality of inflation chambers is filled with air and the flexible skin, supported by the internal skeleton, has a blade structure.

The pivotal connection between the shaft and the support post allows the plurality of turbine blades to yaw about the axis of rotation such that the rotor plane remains substantially perpendicular to the wind direction.

Another aspect of the invention can be described as a vertical axis wind turbine in relation to a wind stream having a wind speed. The wind turbine includes a support post defining an axis of rotation and an inflatable airfoil rotatably connected to the support post.

The right half and the left half of the airfoil are each semi-toroidal. Each also has a leading edge, a trailing edge, a plurality of ribs, and a flexible skin.

The leading edge has a leading edge wire. The trailing edge has an outer trailing edge wire and an inner trailing edge wire. The plurality of ribs connects the leading edge to the trailing edge.

The flexible skin extends from the outer trailing edge wire around the leading edge to the inner trailing edge wire and generally covers each of the plurality of ribs, thereby forming a semi-toroidal airfoil profile. In a version of the invention, the flexible skin does not extend directly from that outer trailing edge wire to the inner trailing edge wire, thereby leaving the trailing edge open and forming an inflation cavity.

The right half and the left half are symmetrical about and join at the support post. The right half is oriented such that the right half leading edge is on a first side of the wind turbine and the right half trailing edge is on an opposite second side of the wind turbine. The left half is oriented such that the left half leading edge is on the second side of the wind turbine and the left half trailing edge is on the first side. The right half leading edge and the left half trailing edge generally form a circular edge on the first side of the wind turbine. The left half leading edge and the right half trailing edge generally form a circular edge on the second side of the wind turbine.

The wind turbine may also include a plurality of self-deploying drag vanes connected to an outside surface of the flexible skin. The drag vanes extend away from the flexible skin when the wind speed is greater than the tangential speed component of the airfoil.

In yet another aspect, the invention can be described as a continuous response, vertical axis wind turbine in relation to a wind stream having a wind speed. The wind turbine has a support post that defines an axis of rotation. The wind turbine also has an inflatable airfoil rotatably connected to the support post and rotating about the axis of rotation at an angular velocity, which has a tangential speed component. The airfoil preferably has a pair of helical blades, although it could have three or more blades.

Each helical blade includes a leading edge, a first trailing edge, a second trailing edge, a flexible skin, and a plurality of ribs. The leading edge forms a helix that is closer to the support post than a helix formed by the first trailing edge and a helix formed by the second trailing edge.

The flexible skin extends from the first trailing edge to the leading edge to form an upper airfoil surface. The flexible skin also extends from the leading edge to the second trailing edge and forms a lower airfoil surface. In a version of the invention, the flexible skin does not extend directly from the first trailing edge to the second trailing edge, thereby leaving the trailing edge open.

The plurality of ribs connects the leading edge to the first trailing edge and the second trailing edge. Each rib extends radially with respect to the support post and is perpendicular to the helix formed by the first trailing edge and the helix formed by the second trailing edge. The plurality of ribs and the flexible skin form a plurality of inflation cavities.

In the inflated condition of the helical blade, the combination of the leading edge, first trailing edge, second trailing edge, flexible skin, and plurality of ribs gives the helical blade and airfoil profile.

In a version of the invention, the continuous response, vertical axis wind turbine also includes a plurality of self-deploying drag vanes connected to the upper airfoil surface and/or the lower airfoil surface. The drag vanes extend from the upper airfoil surface and the lower airfoil surface when the wind speed is greater than the tangential speed component of the airfoil. The drag vanes retract against the respective upper airfoil surface and lower airfoil surface when the tangential speed component of the airfoil is greater than the wind speed.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention is directed to an improved design for a wind turbine, and there are two principal aspects to the disclosed concept. One aspect reduces wind turbine rotor weight by using a parafoil-type airfoil. The other aspect uses a "drag-start" method. Each of these aspects is discussed in detail below.

As an initial matter, but the term "parafoil" will be used throughout this document instead of the more cumbersome term "parafoil-like." But it should be noted that, unless evident from the context, this term does not refer specifically to the traditional parafoil used as a parachute or kite since, among other things, it does not include suspension lines. Rather, the term "parafoil" refers to that part of the traditional parafoil which is a nonrigid or semirigid airfoil inflated by the wind.

The first aspect involves a parafoil design to result in significant reduction in blade mass over state-of-the-art designs. Preferably, the parafoil has a flexible skin, and it is internally supported by a cage-like or skeletal structure. Also, the airfoil preferably has inflatable/collapsible characteristics and allow varying geometries along the blade's circumferential path. The improvement benefits both HAWTs and VAWTs, such as those depicted in the example configurations shown in FIGS. 1-6.

Figure 1:
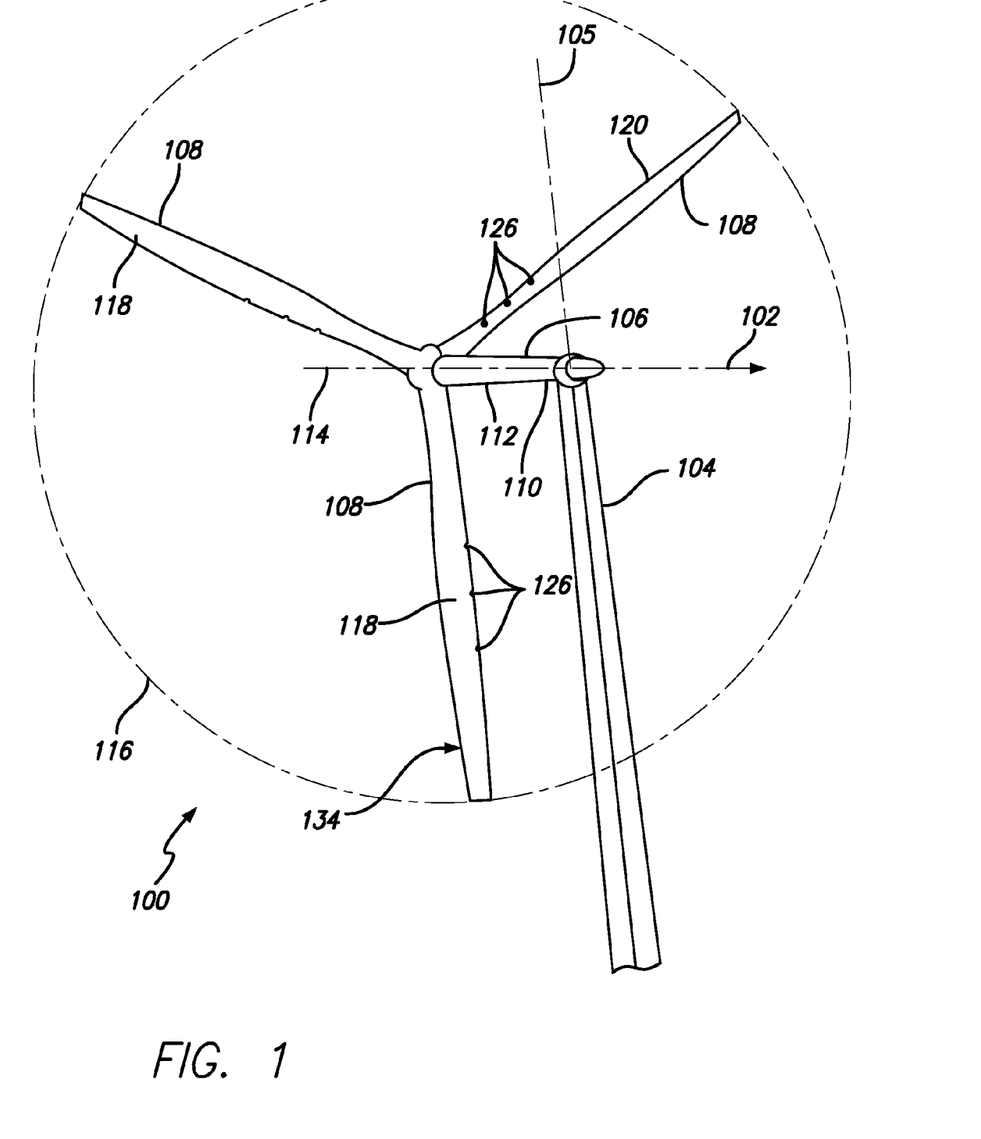
FIG. 1 is a depiction of a self-yawing, self-starting, parafoil HAWT.
Figure 2:
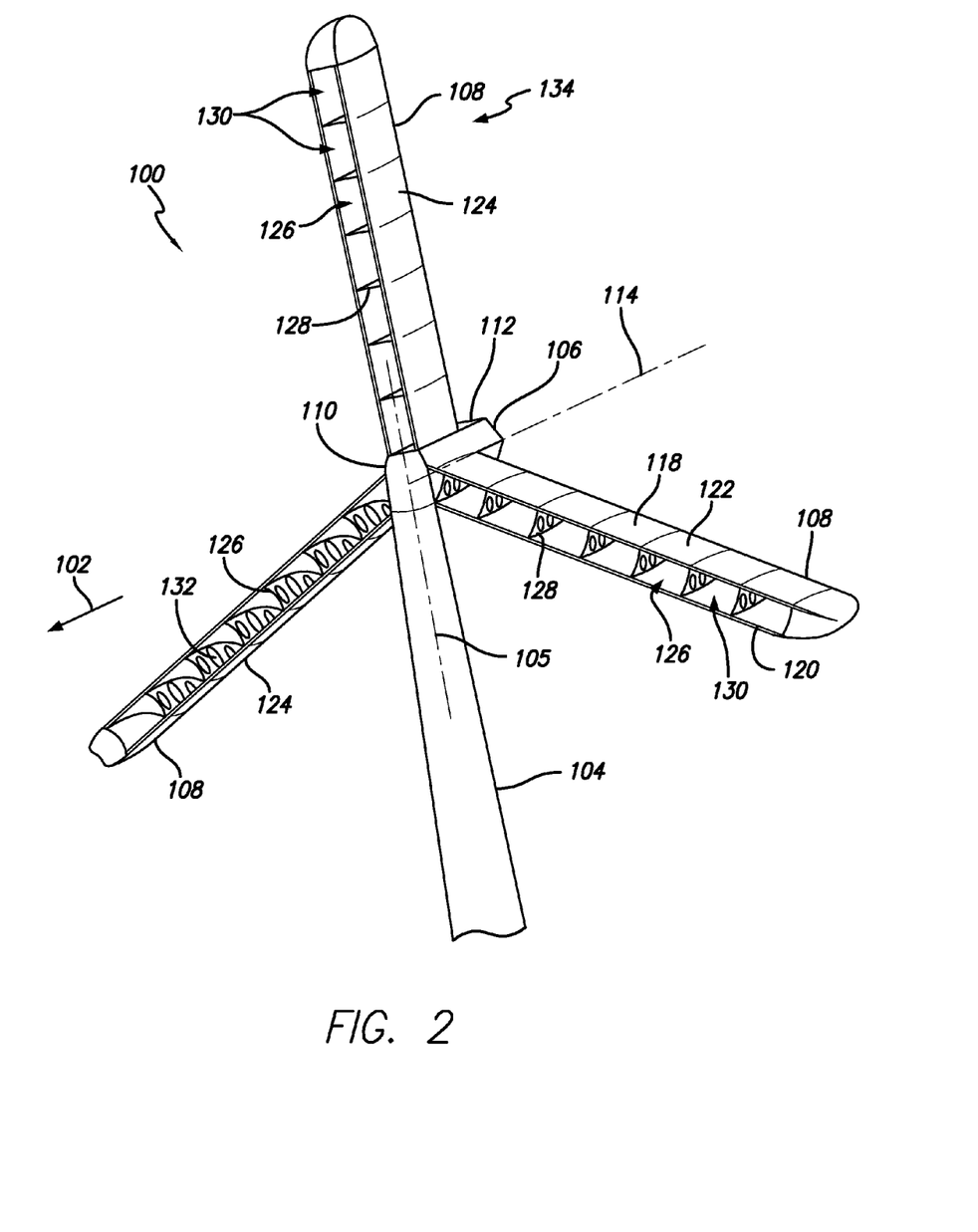
FIG. 2 is a HAWT with parafoil blades.

The parafoil design addresses the challenges for wind turbines (VAWT and HAWT) by reducing the turbine's structural weight. The reduced weight of the blades helps to ease the concerns noted above since both the inertial and dynamic loads are reduced. For the general wind turbine, this invention is advantageous because it will allow turbines to self-yaw, make use of lower quality winds, and gracefully collapse upon impact, such as by a bird, bat, or pedestrian. Refer to FIG. 1 and FIG. 2 for examples of a self-yawing parafoil HAWT designs.

Figure 6:
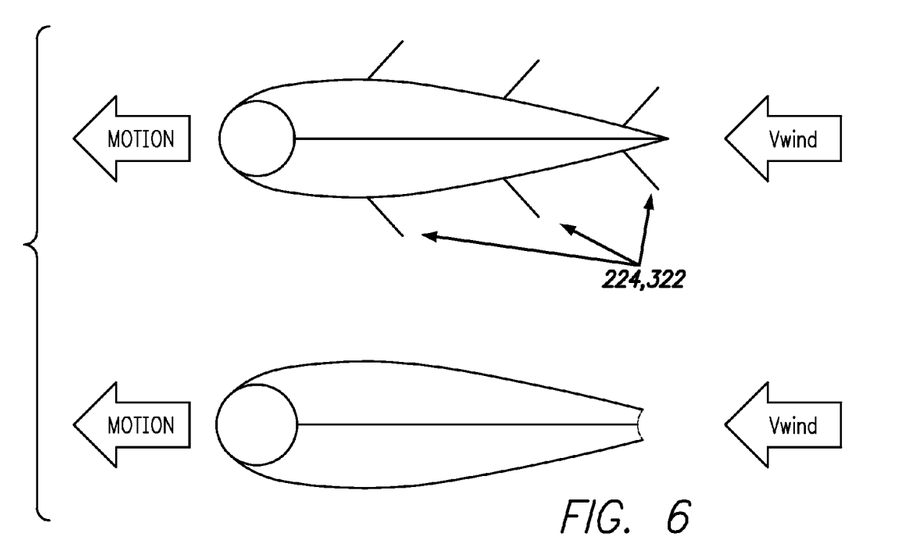
FIG. 6 is a depiction of drag-start airfoils incorporating drag vanes or ram air inflation.

The second aspect makes use of a "drag-start" method to start the rotation of lift-driven wind turbines. The drag force required to start the rotation is obtained from the returning airfoil's geometry (as shown by the bottom airfoil in FIG. 6) by means of deployable flaps, vanes, or cavities. These drag creating devices inflate or extend when the air flows from the airfoil's trailing edge to its leading edge, and retract when the airflow favors the "clean" configuration from the leading edge to the trailing edge. The devices may be made from flexible or rigid material. FIG. 6 shows how unequal drag forces on the airfoils cause an angular acceleration on the rotor, which in turn achieves the necessary angular velocity for the lift-driven rotation to continue. FIG. 7 gives examples of drag-start lift-driven VAWT airfoil profiles.

Figure 5:
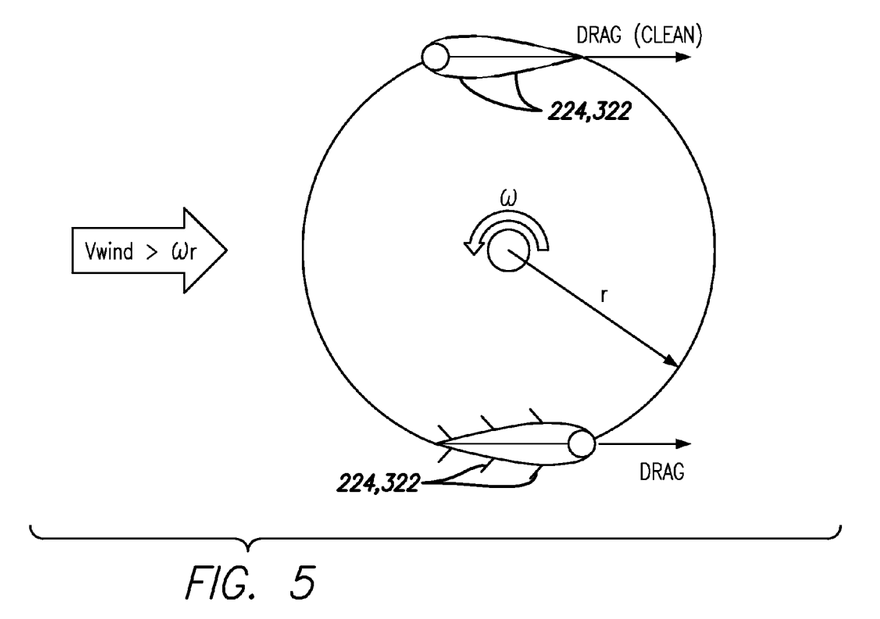
FIG. 5 is depiction of a drag-start method incorporating drag vanes.

This "drag-start" concept is derived from the drag-driven VAWT operating principles, and if combined with lift-driven VAWT principles it will allow a self-starting combination of the two, as shown in FIG. 5. As mentioned above, lift-driven turbines are more efficient than drag-driven ones. This invention will benefit lift-driven wind turbines by eliminating the need for starting mechanisms. They will perform more efficiently since no energy will be expended to start turning the rotor.

A combination of both aspects will yield an efficient wind turbine with very low manufacturing and operating costs which can safely be installed in urban settings.

This invention is very attractive to a wide variety of energy companies, especially with the current enthusiasm for energy technologies in the national and international marketplace. The functions discussed above will allow wind energy devices to be economically used in locations and applications that are currently unattractive with state-of-the-art wind turbines, and will allow consumers to fulfill a portion of their own energy needs. The invention could be easily commercialized due to the expected low-cost manufacturing, improved efficiency, potential for smaller turbine sizes, low weight, easy installation, and overall simplicity.

Accordingly and with particular reference to FIG. 1 and FIG. 2, one aspect of the invention can be described as a horizontal axis wind turbine 100 in relation to a wind direction 102. In keeping with the usual convention, the wind direction 102 shown in the figures points into the wind. The wind turbine 100 includes a support post 104, a shaft 106, and a plurality of turbine blades 108. The support post 104 also defines a pivot axis 105.

The shaft 106 has an upwind portion 110 and a downwind portion 112. The upwind portion 110 is upwind from the downwind portion 112 relative to the wind direction 102. Preferably, the shaft 106 is pivotally connected to the support post 104 at the upwind portion 110 of the shaft 106. The shaft 106 also defines an axis of rotation 114.

The plurality of turbine blades 108 extends radially from the downwind portion 112 of the shaft 106. The turbine blades of the plurality of turbine blades 108 are equally spaced radially about the shaft 106. The plurality of turbine blades 108 rotate about the axis of rotation 114. Each turbine blade 108 has an inflated condition and a deflated condition. The plurality of turbine blades 108 defines a rotor plane 116 in the inflated condition.

Each turbine blade 108 has a flexible skin 118 and an internal skeleton 128, preferably within (that is, substantially surrounded by) the flexible skin 118. The flexible skin 118 includes a leading edge 120, an upper surface 122, and a lower surface 124. The leading edge 120 has one or more openings 126. The internal skeleton 128 supports the flexible skin 118. The upper surface 122, the lower surface 124, and the internal skeleton 128 form a plurality of inflation chambers 130. In a version of the invention, the inflation chambers 130 are connected by cross ports 132 in the internal skeleton 128. Each opening 126 in the leading edge 120 leads to one or more of the inflation chambers 130 for ram air inflation during operation. In the inflated condition, the plurality of inflation chambers 130 is filled with air and the flexible skin 118, which is supported by the internal skeleton 128, has a blade structure. In some embodiments, in the deflated condition the turbine blade 108 is collapsed and does not have a blade structure.

The pivotal connection between the shaft 106 and the support post 104 allows the plurality of turbine blades 108 to yaw about the pivot axis 105 such that the rotor plane 116 remain substantially perpendicular to the wind direction 102.

Figure 3:
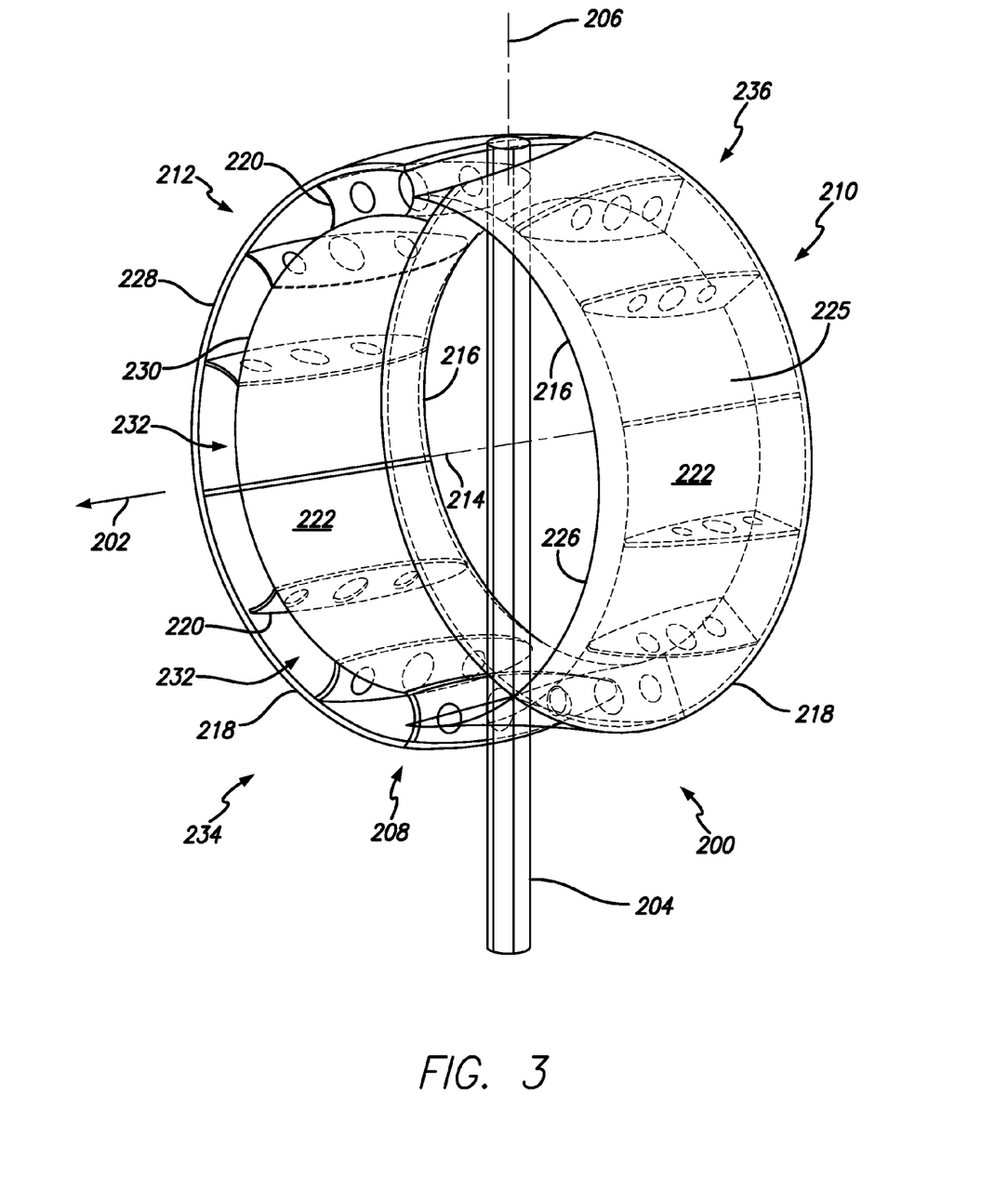
FIG. 3 is a schematic of a collapsible parafoil VAWT with a skeletal structure. The hidden features are shown in broken lines.

With particular reference to FIG. 3, another aspect of the invention can be described as a vertical axis wind turbine 200 in relation to a wind stream 202 having a wind speed. In keeping with the usual convention, the direction of the wind stream 202 shown in the figures points into the wind. The wind turbine 200 includes a support post 204 defining an axis of rotation 206 and an inflatable airfoil 208 rotatably connected to the support post 204. The airfoil 208 rotates about the axis of rotation 206 at an angular velocity that has a tangential speed component. The airfoil 208 has a right half 210 and a left half 212.

Each of the right half 210 and the left half 212 is semi-toroidal and has a toroidal axis 214. The right half 210 and the left half 212 each has a leading edge 216, a trailing edge 218, a plurality of ribs 220, and a flexible skin 222.

The leading edge 216 has a leading edge wire 226, which is preferably a rigid wire or a tube. The trailing edge 218 has an outer trailing edge wire 228 and an inner trailing edge wire 230, each of which is preferably a rigid wire or a tube. The inner trailing edge wire 230 is closer to the toroidal axis 214 then the outer trailing edge wire 228.

The plurality of ribs 220 connects the leading edge 216 to the trailing edge 218. Each rib 220 preferably has airfoil cross-section, meaning it has a cross-section similar to the profiles shown in FIG. 5 and FIG. 6, although other suitable airfoil profiles are also possible. In a version of the invention, the ribs 220 are flexible webbing.

The flexible skin 222 extends from the outer trailing edge wire 228 around the leading edge 216 to the inner trailing edge wire 230 and generally covers each of the plurality of ribs 220, thereby forming a semi-toroidal airfoil profile. In a version of the invention, the flexible skin 222 does not extend directly from that outer trailing edge wire 228 to the inner trailing edge wire 230, thereby leaving the trailing edge 218 open and forming an inflation cavity 232.

The right half 210 and the left half 212 are symmetrical about and join at the support post 204. The right half 210 is oriented such that the right half leading edge 216 is on a first side 234 of the wind turbine 200 and the right half trailing edge 218 is on an opposite second side 236 of the wind turbine 200. The left half 212 is oriented such that the left half leading edge 216 is on the second side 236 of the wind turbine 200 and the left half trailing edge 218 is on the first side 234. The right half leading edge 216 and the left half trailing edge 218 generally form a circular edge on the first side 234 of the wind turbine 200, such as depicted in FIG. 3. The left half leading edge 216 and the right half trailing edge 218 generally form a circular edge on the second side 236 of the wind turbine 200, such as depicted in FIG. 3.

During operation, the wind stream 202 forces air into the inflation cavity 232 thereby inflating the airfoil 208 and producing a drag force. The drag force causes the airfoil 208 to start rotating about the axis of rotation 206.

The wind turbine 200 may also include a plurality of self-deploying drag vanes 224 connected to an outside surface 225 of the flexible skin 222. The drag vanes 224 extend away from the flexible skin 222 when the wind speed is greater than the tangential speed component of the airfoil 208. The drag vanes 224 retract against the flexible skin 222 when the tangential speed component of the airfoil 208 is greater than the wind speed. In a version of the invention, a trailing edge 218 is not open, and the airfoil 208 includes the drag vanes 224 as a way to drag start the airfoil's rotation.

Figure 4:
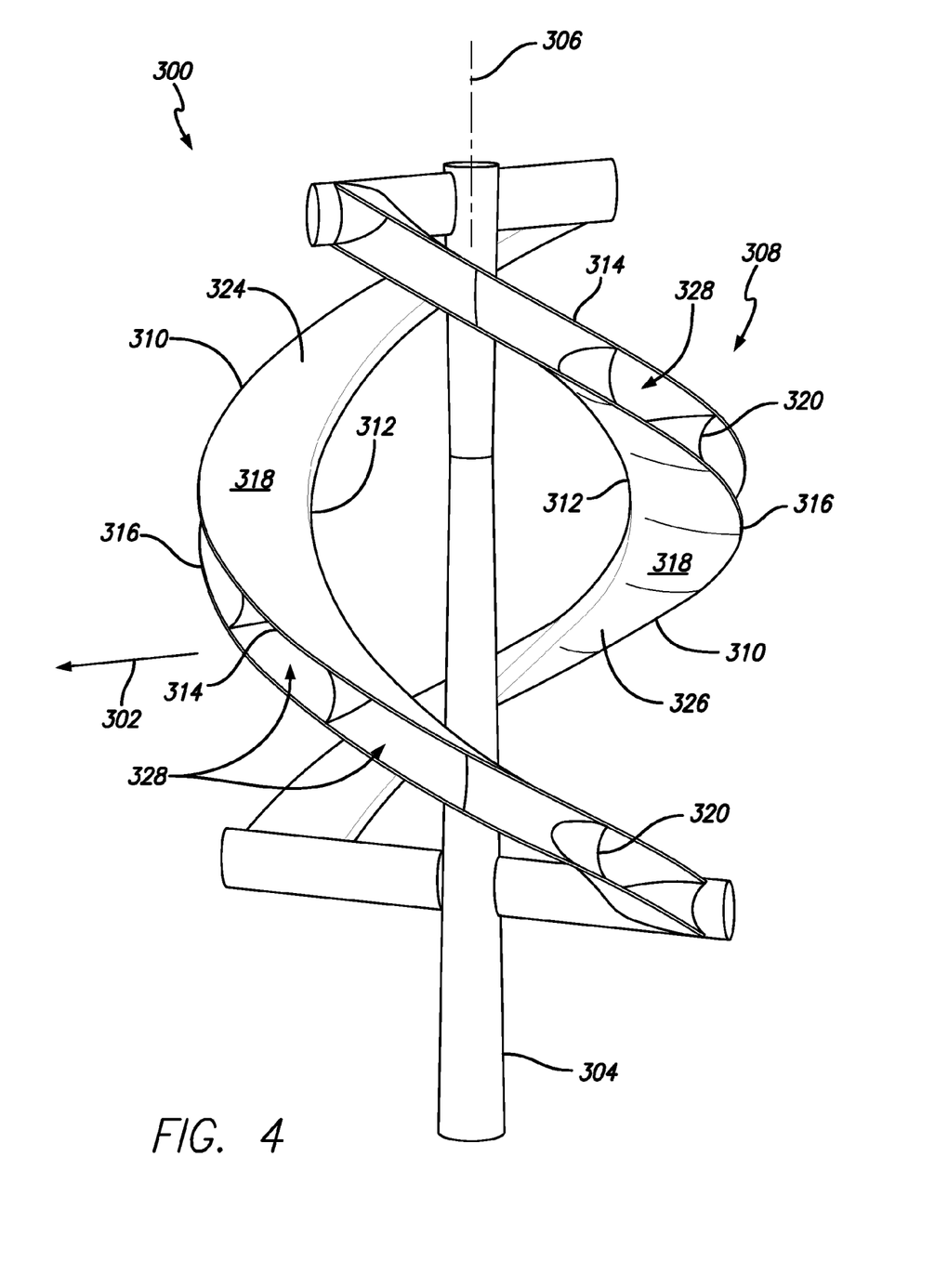
FIG. 4 is a depiction of a continuous response, parafoil VAWT.

With particular reference to FIG. 4, in yet another aspect the invention can be described as a continuous response, vertical axis wind turbine 300 in relation to a wind stream 302 having a wind speed. In keeping with the usual convention, the direction of the wind stream 302 shown in the figures points into the wind. The wind turbine 300 has a support post 304 that defines an axis of rotation 306. The wind turbine 300 also has an inflatable airfoil 308 rotatably connected to the support post 304 and rotating about the axis of rotation 306 at an angular velocity, which has a tangential speed component. The airfoil 308 preferably has helical blades 310.

Preferably, each helical blade 310 has a helical twist of 180 degrees. Each helical blade includes a leading edge 312, a first trailing edge 314, a second trailing edge 316, a flexible skin 318, and a plurality of ribs 320. In a version of the invention, the ribs 320, or webbing, are flexible. The leading edge 312 forms a helix that is closer to the support post 304 than a helix formed by the first trailing edge 314 and a helix formed by the second trailing edge 316. In a version of the invention, the helix formed by the first trailing edge 314 is equidistant from the support post 304 as the helix formed by the second trailing edge 316.

The flexible skin 318 extends from the first trailing edge 314 to the leading edge 312 to form an upper airfoil surface 324. The flexible skin 318 also extends from the leading edge 312 to the second trailing edge 316 and forms a lower airfoil surface 326. Preferably, the flexible skin 318 does not extend directly from the first trailing edge 314 to the second trailing edge 316, thereby leaving the trailing edge open.

The plurality of ribs 320 connects the leading edge 312 to the first trailing edge 314 and the second trailing edge 316. Each rib 320 extends radially with respect to the support post 304 and is perpendicular to the helix formed by the first trailing edge 314 and this helix formed by the second trailing edge 316. Preferably, each rib 320 has an airfoil cross-section. The plurality of ribs 320 and the flexible skin 318 define a plurality of inflation cavities 328.

In an inflated condition of the helical blade 310, the combination of the leading edge 312, first trailing edge 314, second trailing edge 316, flexible skin 318, and plurality of ribs 320 gives the helical blade 310 an airfoil is profile.

During operation, the wind stream 302 forces air into the plurality of inflation cavities 328, thereby inflating the helical blade 310, defining the inflated condition, and producing a drag force. The drag force causes the airfoil 308 to start rotating about the axis of rotation 306.

In a version of the invention, the wind turbine 300 also includes a plurality of self deploying drag vanes 322 connected to the upper airfoil surface 324 and the lower airfoil surface 326. The drag vanes 322 extend from the upper airfoil surface 324 and the lower airfoil surface 326 when the wind speed is greater than the tangential speed component of the airfoil 308. The drag vanes 322 retract against the respective upper airfoil surface 324 and lower airfoil surface 326 when the tangential speed component of the airfoil 308 is greater than the wind speed.

While the present invention has been described with regards to particular embodiments, it is recognized that variations of the present invention may be devised without departing from the inventive concept.

INDUSTRIAL APPLICABILITY

This invention may be industrially applied to the development, manufacture, and use of wind turbines.

What is claimed is:

1. A horizontal axis wind turbine in relation to a wind direction, the wind turbine comprising:
   (a) a support post further defining a pivot axis;
   (b) a shaft having an upwind portion and a downwind portion, the upwind portion being upwind from the downwind portion relative to the wind direction, the shaft being pivotally connected to the support post at the upwind portion of the shaft, the shaft further defining an axis of rotation; and
   (c) a plurality of turbine blades extending radially from the downwind portion of the shaft, the plurality of turbine blades being equally spaced radially about the shaft, the plurality of turbine blades rotating about the axis of rotation, where each turbine blade has an inflated condition and a deflated condition, the plurality of turbine blades defining a rotor plane in the inflated condition, and where each turbine blade comprises (i) a flexible skin, the flexible skin including a leading edge, an upper surface, and a lower surface, the leading edge having one or more openings, and (ii) an internal skeleton within the flexible skin, the internal skeleton supporting the flexible skin, where the upper surface, the lower surface, and the internal skeleton form a plurality of inflation chambers, the inflation chambers being connected by cross ports in the internal skeleton, each opening in the leading edge leading to one or more of the inflation chambers for ram air inflation during operation, where, in the inflated condition the plurality of inflation chambers are filled with air and the flexible skin, supported by the internal skeleton, has a blade structure, where, in the deflated condition the turbine blade is collapsed and does not have the blade structure, and
   where the pivotal connection between the shaft and the support post allows the plurality of turbine blades to yaw about the pivot axis such that rotor plane remains substantially perpendicular to the wind direction.

2. A horizontal axis wind turbine in relation to a wind direction, the wind turbine comprising:
   (a) a support post;
   (b) a shaft defining an axis of rotation; and
   (c) a plurality of turbine blades extending radially from the shaft, the plurality of turbine blades being equally spaced radially about the shaft, the plurality of turbine blades rotating about the axis of rotation, where each turbine blade has an inflated condition and a deflated condition, the plurality of turbine blades defining a rotor plane in the inflated condition, and where each turbine blade comprises (i) a flexible skin, the flexible skin including a leading edge, an upper surface, and a lower surface, the upper surface and the lower surface forming an inflation chamber, the leading edge having one or more openings leading to the inflation chamber for ram air inflation during operation, and (ii) a skeleton supporting the flexible skin, where, in the inflated condition the inflation chamber is filled with air and the flexible skin, supported by the skeleton, has a blade structure, and where, in the deflated condition the turbine blade is collapsed and does not have the blade structure.

3. The wind turbine of claim 2, where shaft has an upwind portion and a downwind portion, the upwind portion being upwind from the downwind portion relative to the wind direction, and the plurality of turbine blades extend radially from the downwind portion of the shaft.

4. The wind turbine of claim 2, where the shaft is pivotally connected to the support post at the upwind portion of the shaft and the support post further defines a pivot axis, and where the pivotal connection between the shaft and the support post allows the plurality of turbine blades to yaw about the pivot axis such that rotor plane remains substantially perpendicular to the wind direction.

5. The wind turbine of claim 2, where the upper surface and the lower surface, along with the skeleton, form a plurality of inflation chambers.

6. The wind turbine of claim 2, where the skeleton is covered by the flexible skin.

7. A vertical axis wind turbine in relation to a wind stream having a wind speed, the wind turbine comprising a support post defining an axis of rotation and a inflatable airfoil rotatively connected to the support post and rotating about the axis of rotation at an angular velocity, the angular velocity having a tangential speed component, the airfoil comprising a right half and a left half, each of the right half and the left half being semi-toroidal and having a toroidal axis, each of the right half and the left half comprising:
   (a) a leading edge comprising a rigid wire referred to here as the leading edge wire;
   (b) a trailing edge comprising a pair of rigid wires referred to here as the outer trailing edge wire and the inner trailing edge wire, where the inner trailing edge wire is closer to the toroidal axis than the outer trailing edge wire;
   (c) a plurality of ribs connecting the leading edge to the trailing edge, each rib having an airfoil cross-section; and
   (d) a flexible skin extending from the outer trailing edge wire around the leading edge to the inner trailing edge wire and generally covering each of the plurality of ribs thereby forming a semi-toroidal airfoil profile, the flexible skin not extending directly from the outer trailing edge wire to the inner trailing edge wire, thereby leaving the trailing edge open and forming an inflation cavity;
   where the right half and the left half are symmetrical about and join at the support post, the right half oriented such that the right half leading edge is on a first side of the wind turbine and the right half trailing edge is on an opposite second side of the wind turbine, the left half oriented such that the left half leading edge is on the second side of the wind turbine and the left half trailing edge is on the first side, where the right half leading edge and the left half trailing edge generally form a circular edge on the first side of the wind turbine, where the left half leading edge and the right half trailing edge generally form a circular edge on the second side of the wind turbine; and where during operation the wind stream forces air into the inflation cavity thereby inflating the airfoil and producing a drag force, the drag force causing the airfoil to start rotating about the axis of rotation.

8. The wind turbine of claim 7, further comprising a plurality of self-deploying drag vanes connected to an outside surface of the flexible skin, the drag vanes extending away from the flexible skin when the wind speed is greater than the tangential speed component of the airfoil, the drag vanes retracting against the flexible skin when the tangential speed component of the airfoil is greater than the wind speed.

9. A vertical axis wind turbine in relation to a wind stream having a wind speed, the wind turbine comprising a support post defining an axis of rotation and a inflatable airfoil rotatively connected to the support post and rotating about the axis of rotation at an angular velocity, the angular velocity having a tangential speed component, the airfoil comprising a right half and a left half, each of the right half and the left half being semi-toroidal and having a toroidal axis, each of the right half and the left half comprising:
　(a) a leading edge comprising a rigid wire referred to here as the leading edge wire;
　(b) a trailing edge comprising a rigid wire referred to here as the trailing edge wire;
　(c) a plurality of ribs connecting the leading edge to the trailing edge, each rib having an airfoil cross-section;
　(d) a flexible skin extending from the trailing edge wire around the leading edge back to the trailing edge wire and generally covering each of the plurality of ribs thereby forming a semi-toroidal airfoil profile; and
　(e) a plurality of self-deploying drag vanes connected to an outside surface of the flexible skin, the drag vanes extending away from the flexible skin when the wind speed is greater than the tangential speed component of the airfoil, the drag vanes retracting against the flexible skin when the tangential speed component of the airfoil is greater than the wind speed;
　where the right half and the left half are symmetrical about and join at the support post, the right half oriented such that the right half leading edge is on a first side of the wind turbine and the right half trailing edge is on an opposite second side of the wind turbine, the left half oriented such that the left half leading edge is on the second side of the wind turbine and the left half trailing edge is on the first side, where the right half leading edge and the left half trailing edge generally form a circular edge on the first side of the wind turbine, where the left half leading edge and the right half trailing edge generally form a circular edge on the second side of the wind turbine.

10. A continuous response, vertical axis wind turbine in relation to a wind stream having a wind speed, the wind turbine comprising a support post defining an axis of rotation; and an inflatable airfoil rotatively connected to the support post and rotating about the axis of rotation at an angular velocity, the angular velocity having a tangential speed component, the airfoil comprising a pair of helical blades symmetrical about the support post, each helical blade having a helical twist of 180 degrees, each helical blade comprising:
　(a) a leading edge,
　(b) a first trailing edge,
　(c) a second trailing edge, where the leading edge forms a helix that is closer to the support post than a helix formed by the first trailing edge and a helix formed by the second trailing edge, and where the helix formed by the first trailing edge is equidistant from the support post as the helix formed by the second trailing edge,
　(d) a flexible skin extending from the first trailing edge to the leading edge and forming an upper airfoil surface, the flexible skin also extending from the leading edge to the second trailing edge and forming a lower airfoil surface, the flexible skin not extending directly from the first trailing edge to the second trailing edge thereby leaving the trailing edge open, and
　(e) a plurality of flexible ribs connecting the leading edge to the first trailing edge and the second trailing edge, each rib extending radially with respect to the support post and being perpendicular to the helix formed by the first trailing edge and the helix formed by the second trailing edge, each rib having an airfoil cross-section, the plurality of ribs along with the flexible skin forming a plurality of inflation cavities;
　where in an inflated condition of the helical blade, the combination of the leading edge, first trailing edge, second trailing edge, flexible skin, and plurality of ribs gives the helical blade an airfoil profile; and
　where during operation the wind stream forces air into the plurality of inflation cavities thereby inflating the helical blade, defining the inflated condition, and producing a drag force, the drag force causing the airfoil to start rotating about the axis of rotation.

11. The wind turbine of claim 10, further comprising a plurality of self-deploying drag vanes connected to the upper airfoil surface and the lower airfoil surface, the drag vanes extending from the upper airfoil surface and the lower airfoil surface when the wind speed is greater than the tangential speed component of the airfoil, the drag vanes retracting against the respective upper airfoil surface and lower airfoil surface when the tangential speed component of the airfoil is greater than the wind speed.

12. A continuous response, vertical axis wind turbine in relation to a wind stream having a wind speed, the wind turbine comprising a support post defining an axis of rotation; and an inflatable airfoil rotatively connected to the support post and rotating about the axis of rotation at an angular velocity, the angular velocity having a tangential speed component, the airfoil comprising at least one helical blade about the support post, the helical blade comprising:
　(a) a leading edge,
　(b) a first trailing edge,
　(c) a second trailing edge, where the leading edge forms a helix that is closer to the support post than a helix formed by the first trailing edge and a helix formed by the second trailing edge,
　(d) a flexible skin extending from the first trailing edge to the leading edge and forming an upper airfoil surface, the flexible skin also extending from the leading edge to the second trailing edge and forming a lower airfoil surface, the flexible skin not extending directly from the first trailing edge to the second trailing edge thereby leaving the trailing edge open, and
　(e) a plurality of flexible ribs connecting the leading edge to the first trailing edge and the second trailing edge, each rib extending radially with respect to the support post and being perpendicular to the helix formed by the first trailing edge and the helix formed by the second trailing edge, each rib having an airfoil cross-section, the plurality of ribs along with the flexible skin forming a plurality of inflation cavities;
　where in an inflated condition of the helical blade, the combination of the leading edge, first trailing edge, second trailing edge, flexible skin, and plurality of ribs gives the helical blade an airfoil profile; and where during operation the wind stream forces air into the plurality of inflation cavities thereby inflating the helical blade, defining the inflated condition, and producing a drag force, the drag force causing the airfoil to start rotating about the axis of rotation.

13. The wind turbine of claim 12, further comprising a plurality of self-deploying drag vanes connected to the upper airfoil surface and the lower airfoil surface, the drag vanes extending from the upper airfoil surface and the lower airfoil surface when the wind speed is greater than the tangential speed component of the airfoil, the drag vanes retracting against the respective upper airfoil surface and lower airfoil surface when the tangential speed component of the airfoil is greater than the wind speed.

* * * * *